United States Patent [19]

Bogese

[11] Patent Number: 4,462,141
[45] Date of Patent: Jul. 31, 1984

[54] FLEXIBLE LOCKING CLAMP USED WITH TUBULAR GUARD FOR LINEAR BODY

[75] Inventor: Charles E. Bogese, Roanoke, Va.

[73] Assignee: Virginia Plastics Company, Roanoke, Va.

[21] Appl. No.: 284,386

[22] Filed: Jul. 17, 1981

[51] Int. Cl.³ .................. F16L 33/00; E04H 12/20
[52] U.S. Cl. .................................... 24/16 PB; 52/147
[58] Field of Search ............ 24/16 PB, 17 AP, 20 R; 248/74 PB; 292/318, 320, 322; 52/147

[56] References Cited

U.S. PATENT DOCUMENTS

| | | | |
|---|---|---|---|
| 1,552,485 | 9/1925 | Hughes | 52/147 |
| 1,988,667 | 1/1935 | Smalley | 189/31.5 |
| 1,995,503 | 3/1935 | Elliott | 52/147 |
| 2,054,988 | 9/1936 | Miller | 189/31.5 |
| 2,935,773 | 5/1960 | Weckesser | 24/17 |
| 3,011,745 | 12/1961 | Reid | 248/74 PB |
| 3,022,557 | 2/1962 | Logan | 24/17 |
| 3,103,103 | 9/1963 | Liddell | 61/54 |
| 3,428,742 | 2/1969 | Smith | 52/147 |
| 3,486,200 | 12/1969 | Orenick | 24/16 PB |
| 3,581,349 | 6/1971 | Verspieren | 24/16 PB |
| 3,605,199 | 9/1971 | Eberhardt | 24/16 PB |
| 3,747,164 | 7/1973 | Fortsch | 24/16 PB |
| 3,874,765 | 4/1975 | Gilmore et al. | 24/16 PB |
| 3,900,922 | 8/1975 | McCormick | 24/16 PB |
| 3,913,876 | 10/1975 | McSherry | 248/74 PB |
| 3,958,379 | 5/1976 | Williams et al. | 52/145 |
| 3,967,345 | 7/1976 | Sumimoto | 24/16 PB |
| 4,128,220 | 12/1978 | McNeel | 24/16 PB |
| 4,135,336 | 1/1979 | Bogese | 52/147 |
| 4,191,334 | 3/1980 | Bulanda et al. | 24/16 PB |
| 4,272,047 | 6/1981 | Botka | 248/74 PB |

*Primary Examiner*—John J. Wilson
*Attorney, Agent, or Firm*—Saidman, Sterne & Kessler

[57] ABSTRACT

A flexible locking clamp (10) particularly designed for use with a tubular guard (50) for a linear body (58) such as a guy wire, cable, conductor, or the like. The locking clamp includes a relatively rigid body portion from which integrally extends a flexible, serrated strap (20). A substantially rigid, arcuate portion (26) connects the strap to the body and is designed to bias the strap at an angle away from the plane of the body. The body also includes means (28) for receiving the free end of the strap after it encircles the desired linear body. The guard wall is provided with aperture means for mounting the clamp, for example, along one edge of a slit that extends longitudinally in the guard. The biased strap provides automatic centering of the linear body in the clamp and guard and permits easy termination of the clamp despite the relative inaccessibility to the interior of the guard.

11 Claims, 12 Drawing Figures

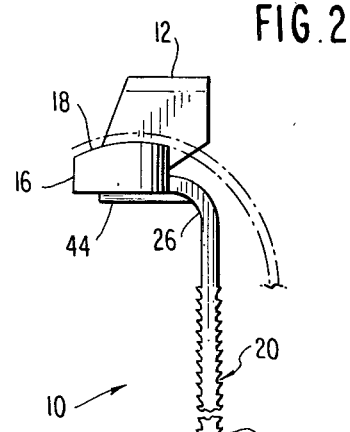
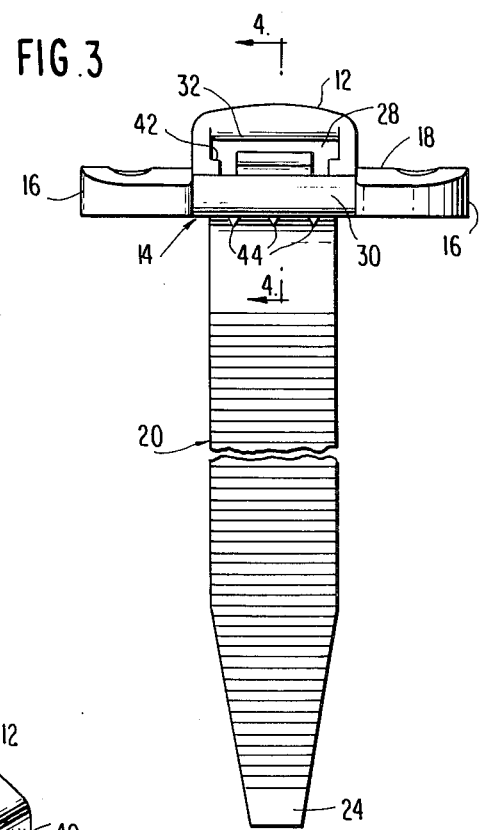
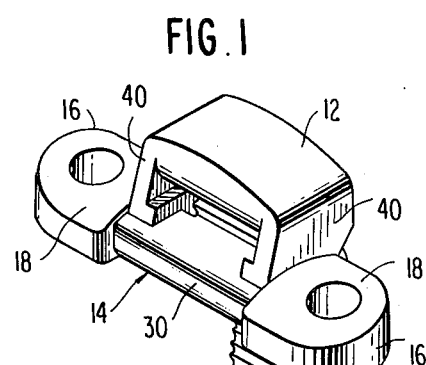
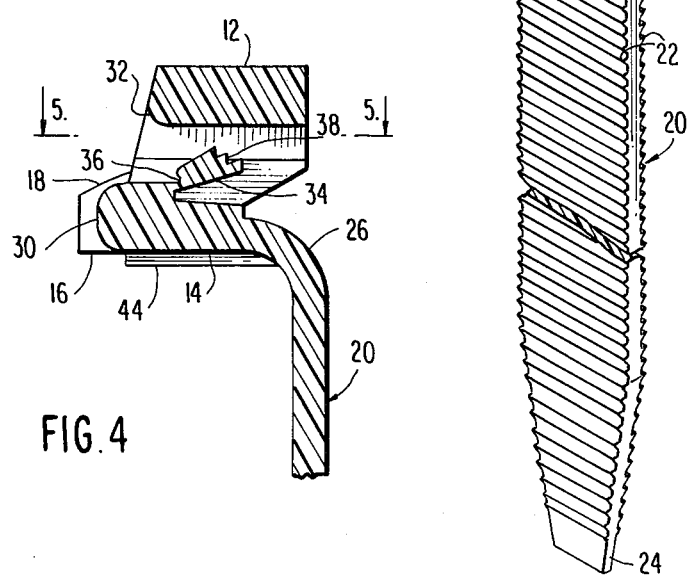
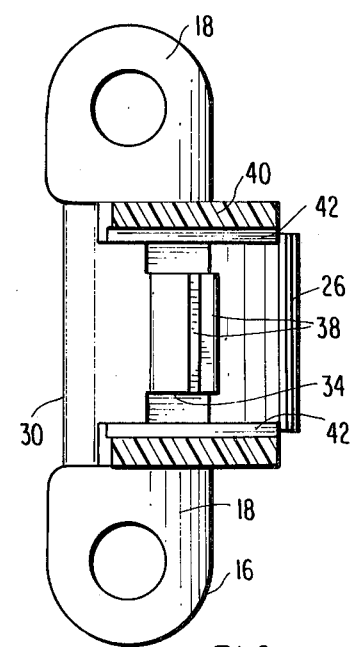

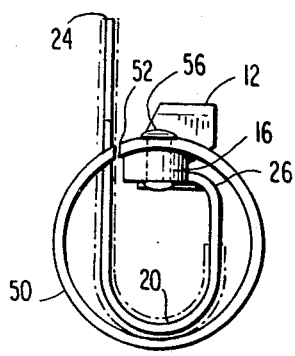
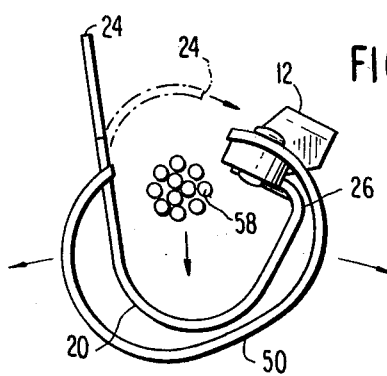
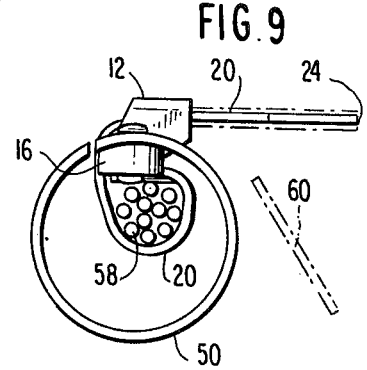
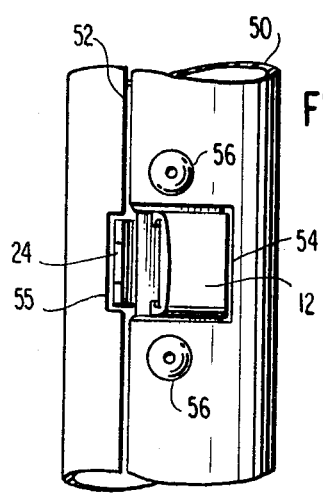
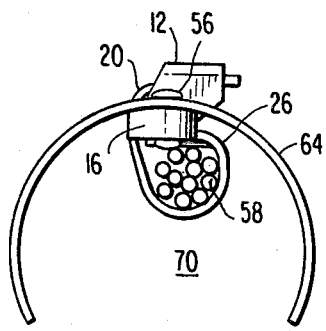
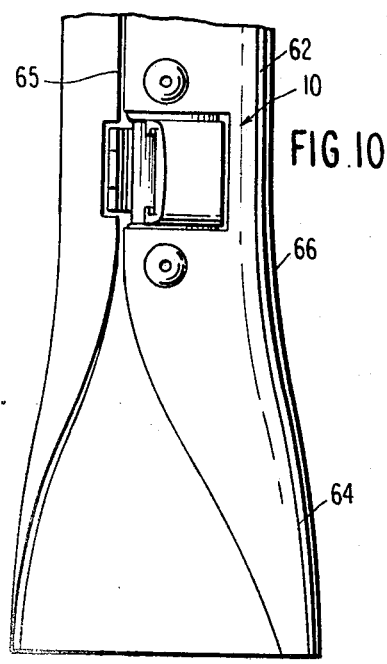
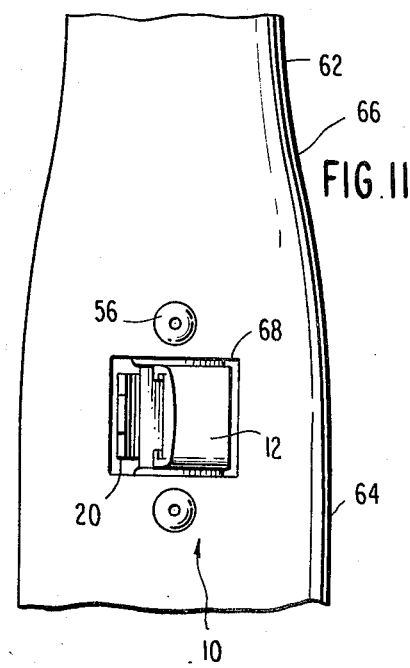

FLEXIBLE LOCKING CLAMP USED WITH TUBULAR GUARD FOR LINEAR BODY

BACKGROUND OF THE INVENTION

1. Field of the Invention

The present invention is related to flexible locking clamps or cable ties and, more particularly, is directed towards the combination of a flexible locking clamp and a tubular guard for a linear body.

2. Description of the Related Art

Tubular guards for linear bodies, such as guy wires, conductors, cables and the like, are well-known. See, for example, U.S. Pat. Nos. 1,950,917; 1,995,503; 1,996,871; 2,061,306; 2,880,828; 3,010,546; and 4,135,336.

It is also well-known that the linear bodies enclosed within such tubular guards must generally be secured to the guards by suitable clamps, such as set forth in U.S. Pat. No. 3,999,340. Other U.S. Pat. Nos. which disclose tubular guards for linear bodies, and means for clamping same together, include: 1,552,485; 1,988,667; 2,054,988; 3,103,103; and 3,958,379. Such means, by and large, comprise metallic V- or U-shaped brackets having threaded bolts, circular jam clamps with threaded bolts, or coiled pigtails.

The brackets and clamps are such that the linear body or guy wire must be guided into position to permit tightening of the bolts so that the mating clamp sections will properly grip the linear body. This guiding operation must be performed inside the tubular guard, which results in a time-consuming operation due to the limited visual access.

The coiled pigtail (see, for example, U.S. Pat. No. 3,958,379) must be initially located externally of the tubular guard to permit the pigtail to be wrapped about the linear body and then pushed up into the tubular guard. Such construction permits the tubular guard to be pushed away from the clamping pigtail, thereby exposing the clamp to potential damage.

The following U.S. Pat. Nos. disclose cable clamps, bundling straps, and support means therefor: 2,935,773; 3,022,557; 3,747,164; 3,900,922; 3,967,345; and 4,128,220. However, none of these cable clamps are particularly designed to be utilized in combination with a tubular guard for securing a linear body therewithin, nor would any of such designs be readily adaptable to such use.

It is towards overcoming the above-noted disadvantages and providing a unique and novel flexible locking clamp design that the present invention is advanced.

OBJECTS AND SUMMARY OF THE INVENTION

A primary object of the present invention is to provide a new and improved flexible locking clamp particularly designed for use with a tubular guard for a linear body.

Another object of the present invention is to provide a flexible locking clamp utilized to secure a linear body such as a guy wire within a plastic tubular enclosure or guard for the linear body.

A further object of the present invention is to provide a novel and improved tubular guard having an internal locking strap which is not directly accessible internally of the guard and, therefore, after termination provides a more secure, tamper-proof unit than heretofore available.

An additional object of the present invention is to provide a unique guard with a flexible locking clamp which is capable of gripping and securing a wide variety of sizes of linear bodies therewithin.

A still further object of the present invention is to provide a combination locking clamp and tubular guard for a linear body which includes a self-locating feature for the body while meeting the requirement that the body be secured within the guard adjacent an inside wall thereof.

Another general object of the present invention is to provide a tubular guard/locking clamp assembly which automatically centers the linear body in the clamp when the body is inserted into the tubular guard.

A still further object of the present invention is to provide a clamping device which does not require tools or extra hardware to secure same about a cable or linear body.

Another object of the present invention is to provide a flexible locking clamp for use with a tubular guard for a linear body, which clamp occupies minimal space inside the tubular guard and yet can accommodate a wide range of linear body sizes.

An additional object of the present invention is to provide a flexible locking clamp which includes means for preventing stress-cracking of the flexible strap when utilized to secure small-diameter linear bodies.

The foregoing and other objects are attained in accordance with one aspect of the present invention through the provision of apparatus which comprises a tubular guard having an inner wall, an outer wall, and a longitudinal slit adapted to receive and house a linear body therein. The apparatus also includes means for clamping the linear body adjacent the inner wall of the guard, the clamping means including a flexible strap, a head portion having means for receiving and locking the strap, and means extending integrally from the head portion for securing the clamping means to the guard. Aperture means are also formed in the guard through which the head portion and the strap extend. The means for securing the clamping means to the guard is preferably positioned adjacent the inner wall of the guard, and the head portion extends through the aperture means beyond the outer wall of the guard.

In accordance with more detailed aspects of the present invention, the securing means preferably comprises a pair of shoulders extending one on each side of the head portion, the shoulders including arcuate top surfaces for contacting the inner wall of the guard. The clamping means further comprises a base portion positioned below the head portion and between the pair of shoulders and a pair of side walls connecting the head to the base. The head, base and side walls define the means for receiving the strap. The means for locking the strap preferably comprises a tongue member hingedly connected to the base and extending into the receiving means for allowing the strap through the receiving means in one direction only. One end of the strap preferably extends integrally from the rear end of the base, while the other end of the strap is initially free and is adapted to encircle the linear body and then be inserted over the front end of the base into the receiving and locking means. The clamp further comprises a relatively inflexible molded curved portion for coupling the rear end of the base to the flexible strap for initially urging the flexible strap adjacent the inner wall of the guard.

In accordance with another aspect of the present invention, the slit in the guard is defined by two opposed edges, and the aperture means comprises a cutout extending inwardly from at least one of the two opposed edges, the cutout being sized to receive the head of the clamp therethrough. The aperture means may further comprise a second cutout extending inwardly from the other of the two opposed edges, the second cutout sized to receive the strap therethrough. Alternatively, the guard may include a flared end portion where the edges defining the longitudinal slit diverge, the aperture means in this embodiment comprising a hole formed in the flared end which is sized to receive both the head and the strap therethrough.

In accordance with another aspect of the present invention, a clamp is provided which comprises a flexible strap having a secured end and a free end, a body to which the strap is connected and which includes means for retaining the free end, mounting means extending integrally from the body for permitting the clamp to be mounted to a support member, and a relatively inflexible arcuate portion connecting the body to the secured end of the flexible strap for biasing the strap angularly away from the plane of the mounting means.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a perspective, partially broken view of a preferred embodiment of a flexible locking clamp in accordance with the present invention;

FIG. 2 is a side view of the preferred embodiment illustrated in FIG. 1;

FIG. 3 is a front view of the embodiment illustrated in FIG. 2;

FIG. 4 is an enlarged, cross-sectional view of a portion of the embodiment illustrated in FIG. 3 and taken along line 4—4 thereof;

FIG. 5 is an enlarged, sectional view taken along line 5—5 of FIG. 4;

FIG. 6 is an end view illustrating the embodiment of FIGS. 1-5 in combination with a tubular guard for a linear body;

FIG. 7 is a side view of the combination of FIG. 6;

FIG. 8 illustrates the embodiment of FIG. 6 during insertion of the linear body therein;

FIG. 9 is sequential to FIG. 8 and illustrates the final position of the components after the linear body has been secured within the guard housing;

FIG. 10 illustrates the combination of the clamp with a flared-end tubular guard;

FIG. 11 is a side view of a clamp of the present invention utilized in combination with the flared-end portion of the tubular guard; and FIG. 12 is a side or end view of the combination of FIG. 11.

DETAILED DESCRIPTION OF THE PREFERRED EMBODIMENTS

Referring now to the drawings, wherein like reference numerals represent identical or corresponding parts throughout the several views, and more particularly to FIGS. 1-5 thereof, there is illustrated a preferred embodiment of a flexible locking clamp in accordance with the present invention which is indicated generally by reference numeral 10.

Generally, clamp 10 includes a flexible strap portion 20 which is connected to a relatively rigid body portion. The body portion includes a head portion 12, a base portion 14, and a pair of side walls 40 which connect the head 12 to the base 14.

Extending integrally from base 14 on both sides of the body are a pair of apertured mounting shoulders 16. Mounting shoulders 16 preferably include rounded or arcuate top surfaces 18 which permit same to be mounted adjacent and in contact with a support member which is indicated in dotted outline in FIG. 2 and which will be described in greater detail hereinafter.

The flexible strap portion 20 includes a plurality of ribbed teeth or serrations 22 which extend transversely along one or both sides of the strap 20. The teeth 22 are oriented parallel to one another and transversely to the longitudinal axis of strap 20. Strap 20 preferably terminates in a tapered free end portion 24 to facilitate insertion thereof into the body.

The other end of flexible strap 20 is connected to the rear end of the base 14 by means of a relatively rigid, molded arcuate portion 26. Arcuate portion 26 ensures that the flexible strap 20 is angled away from the plane of mounting shoulders 16 for reasons which will become more clear hereinafter.

Head 12, base 14 and side walls 40 define an opening 28 for receiving strap 20 via tapered insertion tip 24. It is noted that the front portion 30 of base 14 is rounded (FIG. 4) to facilitate insertion of end 24, as is the front portion 32 of head 12.

Still with reference to FIGS. 4 and 5, a locking tongue 34 extends integrally from the upper surface of base 14 and is hingedly mounted thereto by means of a thin, flexible web 36. Transverse ribs 38 are formed on locking tongue 34 and are adapted to be complementary to the teeth 22 positioned on strap 20.

As shown in FIGS. 3 and 5, ledges 42 are formed in side walls 40 for guiding the strap 20 through opening 28.

The underside of base 14 may also be provided with a plurality of substantially parallel, anti-twist ribs 44 to secure clamp 10 to an appropriate support member in certain mounting installations (not shown).

In operation, the tapered end 24 of strap 20 is inserted into opening 28 from the left-hand side as viewed in FIG. 4. As teeth 22 contact ribs 38 on locking tongue 34, the strap 20 is permitted to continue to be inserted through opening 28. However, ribs 38 coact with teeth 22 to prevent withdrawal of the strap 20 from the opening 28 once inserted.

Referring now to FIGS. 6-12, and more particularly to FIGS. 6 and 7, the clamp 10 of the present invention is shown in combination with a tubular guard indicated by reference numeral 50. Guard 50 may comprise a long, tubular plastic housing or the like having a slit 52 extending along its length so as to permit a linear body to be inserted within guard 50.

In the embodiment of FIGS. 6 and 7, a substantially rectangular cutout 54 is formed inwardly of one edge of slit 52 and is adapted to receive the head portion 12 of clamp 10. The opposite edge of guard 50 which forms slit 52 also preferably includes a cutout portion 55 which is adapted to receive the strap body 20 therethrough.

The mounting shoulders 16 of clamp 10 underlie the guard housing 50. The apertures formed in shoulders 16 are preferably aligned with similarly sized apertures formed in guard wall 50 to permit same to be fastened together by, for example, rivets 56. FIG. 6 illustrates the relative position of the components just subsequent to the installation of clamp 10 on guard 50, but prior to the insertion of a linear body.

Referring now to FIG. 8, the slit 52 of guard 50 has been spread apart, either manually or with the aid of a tool, and it may be appreciated from FIG. 8 that the end portion of strap 20 lies within groove 55 and therefore remains with one side of the slit, while the fixed end which includes the head 12 remains with the other side of the slit. Molded arcuate portion 26 of clamp 10 helps ensure that the flexible strap 20 assumes a position similar to that shown in FIGS. 6 and 8 prior to insertion of the linear body 58 inside the housing 50. In other words, arcuate portion 26 helps ensure that the flexible strap 20 will remain closely adjacent the inside wall of guard 50 which, as will be appreciated, facilitates automatic centering and installation of linear body 58 therein.

After the guard 50 is spread as illustrated in FIG. 8, linear body 58 is inserted within the guard 50 and automatically, therefore, becomes inserted within strap 20 as the slit 52 is allowed to re-close. As shown in FIG. 9, the free end 24 of strap 20 is then inserted through the opening in head portion 12 until the desired tightness about linear body 58 has been achieved. Strap 20 is automatically locked in head 12 as explained above. Thereafter, the excess end portion 60 of strap 20 may be severed by a cutting tool or the like.

It may be appreciated that the foregoing design does not require manipulation of either the clamp or the guy wire inside the guard, such manipulation being automatically taken care of by the self-centering clamp design. The molded bent portion 26 further prevents stress-cracking of the strap when securing a smaller-diameter linear body.

Referring now to FIG. 10, there is illustrated a tubular guard having a substantially constant diameter portion 62, a flared end portion 64, and a transition portion 66 interconnecting the portions 62 and 64. See, for example, U.S. Pat. No. 4,135,336. In this embodiment, clamp 10 may be installed along the slit 65 in much the same manner as with the embodiments of FIGS. 6–9.

FIGS. 11 and 12 illustrate an alternate construction wherein clamp 10 is installed not at the slit 65, but rather in the flared end portion 64 at a location opposite to that where the opposed edges which form slit 65 diverge. The inherently large opening 70 is not desirable for edge-mounting the clamp 10. For this purpose, a relatively large rectangular hole or aperture 68 is formed in the body of flared end portion 64. Aperture 68 is large enough to accommodate both head 12 as well as strap 20 therethrough. This embodiment differs slightly from the previously-described embodiment in that the internal portion of the clamp as well as the linear body to be positioned therein is relatively accessible through the large opening 70. However, the clamp 10 may still be used without modification.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus, which comprises:
   a tubular guard having an inner wall, an outer wall, and a longitudinal slit adapted to receive and house a linear body therein;
   means for clamping said linear body adjacent said inner wall of said guard, said clamping means including a flexible strap, a body portion having a head portion and means for receiving and locking said strap, and means extending integrally from said body portion for securing said clamping means to said guard; and
   aperture means formed in said guard through which said head portion and said strap extend.

2. Apparatus, which comprises:
   a tubular guard having an inner wall, an outer wall, and a longitudinal slit adapted to receive and house a linear body therein;
   means for clamping said linear body adjacent said inner wall of said guard, said clamping means including a flexible strap, a body portion having a head portion and means for receiving and locking said strap, and means extending integrally from said body portion for securing said clamping means to said guard; and
   aperture means formed in said guard through which said head portion and said strap extend, wherein said means for securing said clamping means to said guard is positioned adjacent said inner wall of said guard, and said head portion extends through said aperture means beyond said outer wall of said guard.

3. Apparatus, which comprises:
   a tubular guard having an inner wall, an outer wall, and a longitudinal slit adapted to receive and house a linear body therein;
   means for clamping said linear body adjacent said inner wall of said guard, said clamping means including a flexible strap, a body portion having a head portion and means for receiving and locking said strap, and means extending integrally from said body portion for securing said clamping means to said guard; and
   aperture means formed in said guard through which said head portion and said strap extend, wherein said securing means comprises a pair of shoulders extending one on each side of said body portion, said shoulders including arcuate top surfaces being in contact with said inner wall of said guard.

4. The apparatus as set forth in claim 3, wherein said body portion further comprises a base portion positioned below said head portion and between said pair of shoulders, and a pair of side walls connecting said head to said base, said head, base and side walls further defining said means for receiving said strap.

5. The apparatus as set forth in claim 4, wherein said means for locking said strap comprises a tongue member hingedly connected to said base and extending into said receiving means for allowing said strap to be fed through said receiving means in one direction only.

6. The apparatus as set forth in claim 4, wherein one end of said strap extends integrally from the rear end of said base, and the other end of said strap is initially free and is adapted to encircle said linear body and then be inserted over the front end of said base into said receiving and locking means.

7. The apparatus as set forth in claim 6, further comprising a relatively inflexible molded curved portion coupling said rear end of said base to said flexible strap for initially urging said flexible strap adjacent said inner wall of said guard.

8. The apparatus as set forth in claims 1 or 7, wherein said guard further includes a flared end portion where the edges defining said slit diverge, said aperture means comprising a hole formed in said flared end portion, said hole sized to receive both said head and said strap therethrough.

9. The apparatus as set forth in claim 3, further comprising apertures positioned in said shoulders for receiving means for securing said clamping means to said guard.

10. Apparatus, which comprises:
   a tubular guard having an inner wall, an outer wall, and a longitudinal slit adapted to receive and house a linear body therein;
   means for clamping said linear body adjacent said inner wall of said guard, said clamping means including a flexible strap, a body portion having a head portion and means for receiving and locking said strap, and means extending integrally from said body portion for securing said clamping means to said guard; and
   aperture means formed in said guard through which said head portion and said strap extend, wherein said slit is defined by two opposed edges, and said aperture means comprises a cutout extending inwardly from at least one of said two opposed edges, said cutout sized to receive said head therethrough.

11. The apparatus as set forth in claim 10, wherein said aperture means further comprises a second cutout extending inwardly from the other of said two opposed edges, said second cutout sized to receive said strap therethrough.

* * * * *